O. P. HUMBER.
Cotton Planter.
No. 96,919.                                    Patented Nov. 16, 1869.
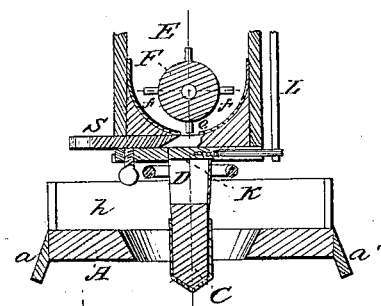
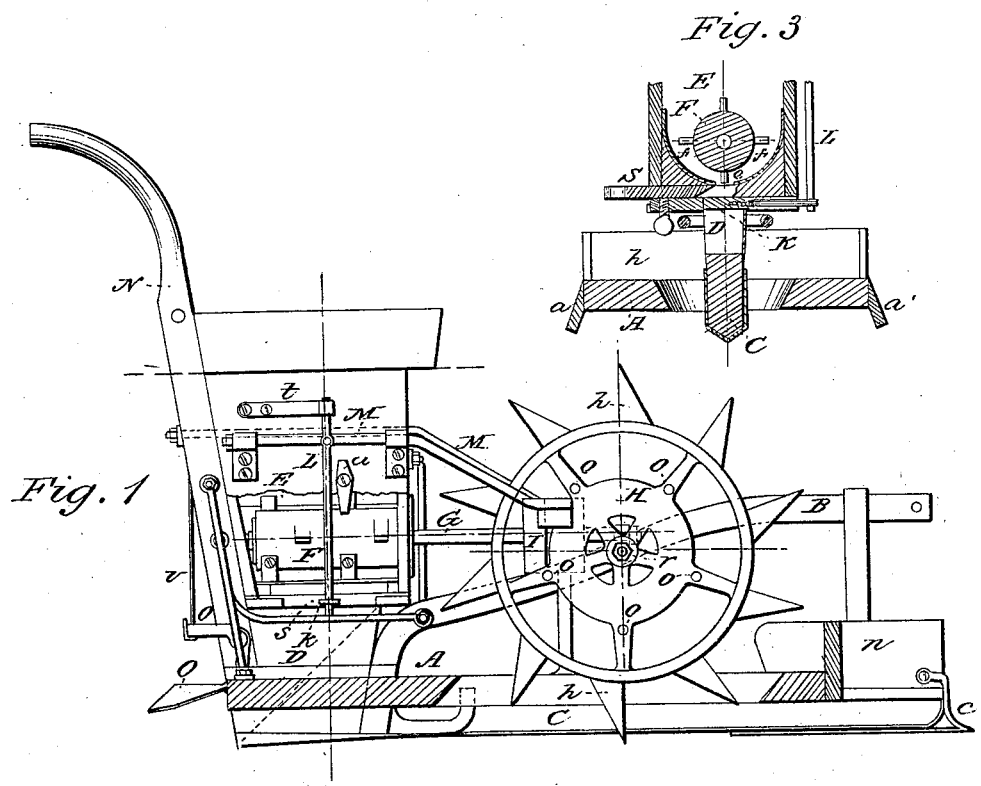
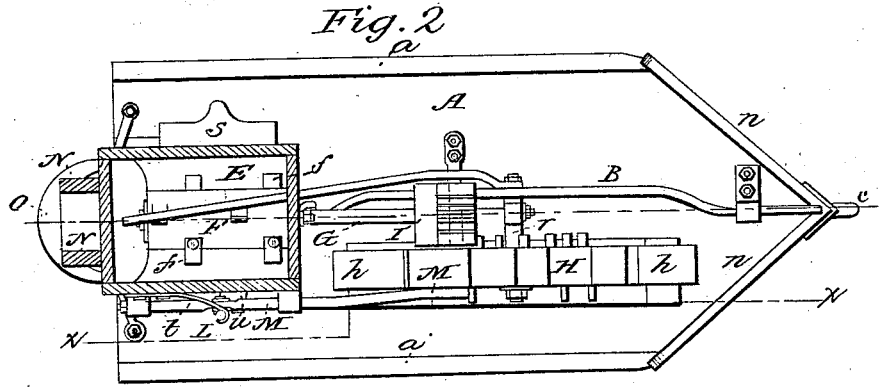
Witnesses:                                     Inventor:

United States Patent Office.

O. P. HUMBER, OF GREENVILLE, NORTH CAROLINA.

Letters Patent No. 96,919, dated November 16, 1869.

IMPROVEMENT IN COTTON-SEED PLANTER.

The Schedule referred to in these Letters Patent and making part of the same.

*To all whom it may concern:*

Be it known that I, O. P. HUMBER, of Greenville, in the county of Pitt, and in the State of North Carolina, have invented a new and useful Improvement in Cotton-Seed Planters; and I do hereby declare that the following is a full, clear, and exact description thereof, reference being had to the accompanying drawings, and to the letters of reference marked thereon.

My invention consists in producing a cotton-planter with which the ground may be smoothed, the seed planted, either in hills or drills, and which may be regulated to distribute the seed in any quantity desired, as hereinafter more fully described.

To enable others skilled in the art to make and use my invention, I will proceed to describe its construction and operation.

Figure 1 represents an elevation and section, taken in line x x, fig. 2, with a portion of the front of the hopper removed.

Figure 2 represents a plan of the machine.

Figure 3 represents a transverse section through the hopper.

The frame-work consists of a wooden bed, or float, A, for smoothing and levelling the ground, with guides a a' pointed in front, and there provided with a fender, n.

On the float the beam B is mounted, and it has, on its under side, a runner, C, for making a furrow, into which the seed is dropped.

The point c may be attached or left off.

The rear end of the runner consists of a flat funnel, D, extending upward through and a short distance above the float, and is surmounted by the seed-box or hopper E.

Inside of the hopper is a cylinder, F, with flanges, or teeth f f, mounted on the shaft G, for agitating the seed, preventing it packing or clogging, and carrying it down to the lowest part of the curved bottom, where it is dropped through a slot, e, which is directly over and runs parallel with the flat funnel.

On one side of the hopper is a slide, s, which, when pushed in all the way, covers the slot and shuts off communication between the hopper and funnel. It is used to regulate the quantity of seed dropped.

The cylinder in the hopper is operated by the large driving-wheel H, by means of a pinion, I, which is fixed on the shaft G.

The driving-wheel has points or teeth h h, which take hold on the ground when the machine is drawn forward, revolving the wheel over its shaft r, which is fixed to the beam.

The bottom of the hopper is also provided with a sliding valve, K, which is set in motion when it is desired to plant the seed in hills.

It is connected by an eye-bolt to the long end of the lever L, which is fixed to and has its fulcrum on the shaft M.

The short end of this lever lays against the end of the curved spring t, the other end of which is fastened to the side of the hopper.

When the machine is at rest, the sliding valve is kept closed, by means of the spring and lever, and shuts off communication between the hopper and flat funnel.

The shaft M lays in two blocks fastened to the side of the hopper. That part of it which extends beyond the hopper is bent downward, forming a crank, and has at its end, which runs along the disk of the driving-wheel, a lip.

The sliding valve is operated by means of five pins, o o o o o, on the disk of the driving-wheel, which run under the lip of the crank part of the shaft M, throwing it outward, which turns the straight end of the shaft in such a way as to throw the long end of the lever outward, opening the valve. As soon as a pin escapes from the lip of the crank, the valve is closed by the action of the spring on the lever. By the same action, the shaft is placed in position to be operated on by the next pin.

When it is desired to drop the seed continuously, the sliding-valve is held open by turning the end of the button u under the long end of the lever. This will also throw out the crank far enough from the driving-wheel to keep it clear of the pins.

On the back of the hopper, the handles N N are fastened, running down to and forming the rear end of the funnel.

Attached to them is the scraper O, for burying the seed and closing the furrow. It is held to its work by the spring v.

Instead of having the driving-wheel to operate through a slot in the bed, or float, A, as shown in the drawings, the side of the float on which the wheel is placed may be cut away for a space equal to the diameter of the wheel.

The guides a a are for the purpose of marking the ground to guide in running the rows parallel, and also serve to make the planter run steadily, but they may be dispensed with, if desired.

What I claim as my invention, and desire to secure by Letters Patent, is—

1. The sliding valve K, and devices for operating the same, in combination with the cylinder E, substantially as and for the purpose set forth.

2. The sliding valve K, in combination with the lever L, spring t, shaft M, and pins o of the driving-wheel H, substantially as described, and for the purpose specified.

3. The slide s, in combination with the cylinder E and valve K, when operating substantially as and for the purpose set forth.

The above specification signed by me, this 8th day of April, 1869.

O. P. HUMBER.

Witnesses:
JOHN HILLIARD,
G. W. COX.